April 19, 1955     R. D. HORLAND     2,706,492
CONTROL VALVE

Filed Dec. 3, 1951     2 Sheets-Sheet 1

Richard D. Horland
*INVENTOR.*

BY *Attorneys*

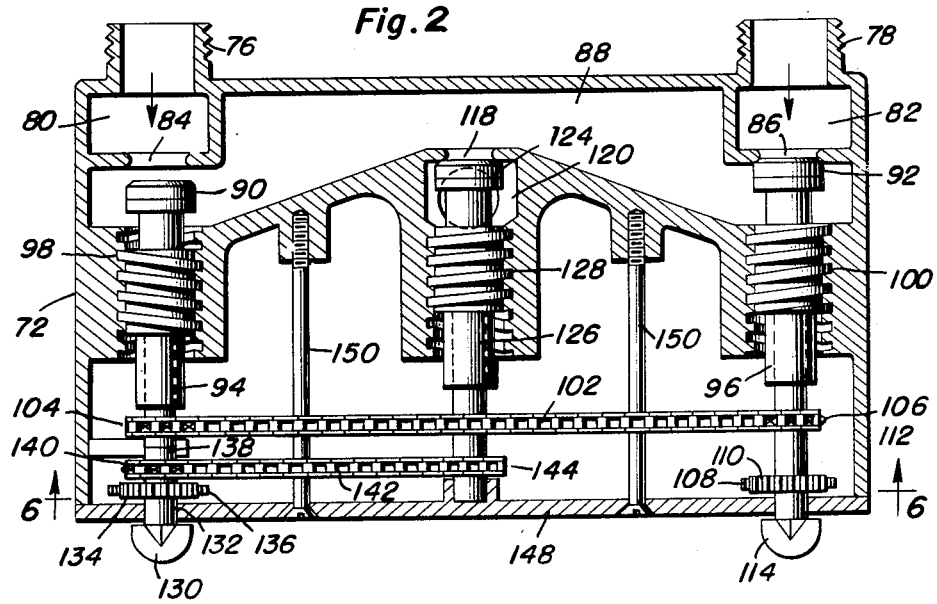
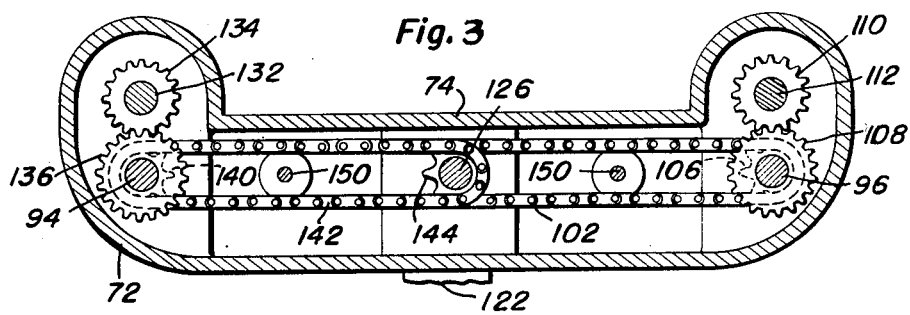
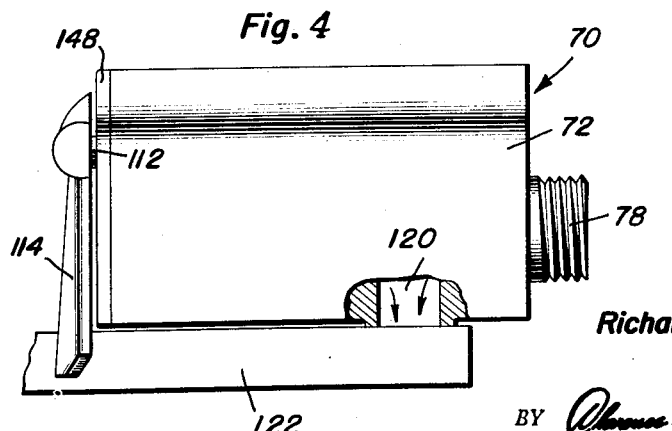
Richard D. Horland
INVENTOR.

United States Patent Office 2,706,492
Patented Apr. 19, 1955

2,706,492

CONTROL VALVE

Richard D. Horland, Newark, N. J.

Application December 3, 1951, Serial No. 259,660

2 Claims. (Cl. 137—607)

This invention relates to new and useful improvements and structural refinements in control valves, particularly valves of the faucet type which are used for regulating the flow of water on sinks, basins, bathtubs, etc. and the principal object of the invention is to provide a control valve of the character herein disclosed, which may be conveniently and effectively employed for mixing hot and cold water in any desired proportion, as well as regulating the rate of flow of the mixed water, including shutting off the same.

An important feature of the invention, therefore, resides in the provision of multiple valve means which are embodied into a single unit which is highly pleasing in appearance, unique in design, efficient and dependable in operation, and adaptable to economical manufacture.

With the above more important objects and features in view and such other objects and features as may become apparent as this specification proceeds, the invention consists essentially of the arrangement and construction of parts as illustrated in the accompanying drawings, in which:

Figure 2 is a horizontal sectional view of the invention;

Figure 3 is a transverse sectional detail, taken substantially in the plane of the line 3—3 in Figure 2; and Figure 4 is an end view of the embodiment shown in Figure 1, the same being partially broken away, and shown in section.

Like characters of reference are employed to designate like parts in the specification and throughout the several views.

Figure 1:
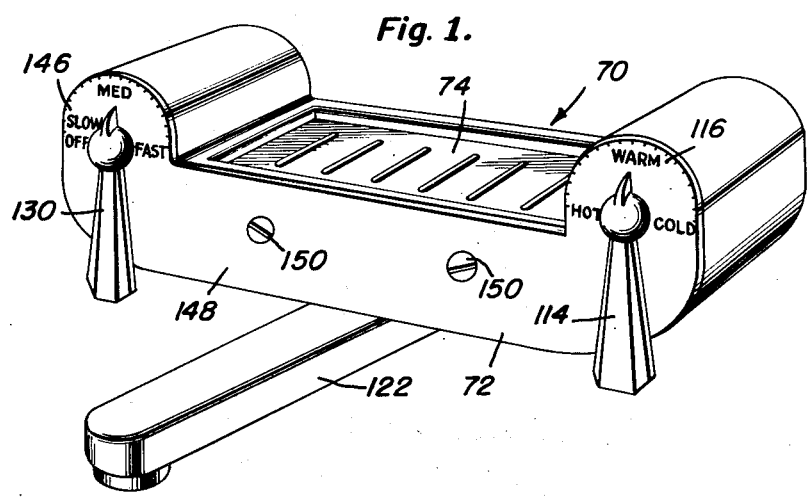
Figure 1 is a perspective view of an embodiment of the invention.

With continuing reference to the accompanying drawings wherein like reference numerals designate similar parts throughout the various views, reference numeral 70 generally designates the invention which includes a valve body 72 which may be conveniently shaped so as to provide a soap dish 74 intermediate the ends thereof, while the back of the body is equipped with hot and cold water connections 76, 78, respectively, communicating with the respective inlet passages 80, 82. These passages, in turn, have hot and cold water valve ports 84, 86, respectively, in communication with a mixing chamber 88, the valve ports being adapted for coaction with hot and cold valve members 90, 92, mounted on suitable stems 94, 96 having spaced parallel axes.

The stems 94, 96 also have screw-threaded portions 98, 100 engaging complemental screw-threaded bores provided in the valve body, and it is to be noted that the screw-threads of the two valves are of opposite hands, so that when one valve is rotated to a closed position, rotation of the other valve in the same direction will open it. Means are provided for simultaneously rotating the two valve stems so that one may be opened while the other is being closed, and vice versa, these means comprising an endless sprocket chain 102 which passes around sprocket wheels 104, 106 carried by the respective stems 94, 96. The stem 96 also carries a gear 108 meshing with a similar gear 110 on a shaft 112 which is rotatably journaled in the valve body and projects forwardly therefrom to carry a control handle 114. By turning the handle in one direction or the other, the movement thereof will be transmitted through the gears 110, 108 and the chain drive 102 to effect simultaneous rotation of the valve stems 94, 96 so as to close one valve and simultaneously open the other, whereby hot and cold water may be admitted into the mixing chamber 88 in any desired proportion. The housing 72 may carry a suitable legend 116 adjacent the handle 114, as shown in Figure 4.

The mixing chamber 88 communicates through the medium of a valve port 118 with an outlet 120 provided with a conventional discharge spout 122, and a valve member 124 coacts with the valve port 118 to regulate the rate of flow of the mixed water therethrough. The valve member 124 is carried by a stem 126 having a screw-threaded portion 128 operatively engaging a complemental screw-threaded bore in the valve body, and rotation of the stem 126 is effected by means of a control handle 130 which is disposed at the front of the housing and is secured to a shaft 132 having a gear 134 secured thereon. This gear meshes with a similar gear 136 which is mounted on a stub shaft 138 in the housing, this stub shaft also carrying a sprocket 140 connected by an endless sprocket chain 142 to a similar sprocket 144 on the stem 126. It is to be noted that although the sub shaft 138 is coaxial with the stem 94, it is rotatable independently thereof in response to the actuation of the handle 138, while the stem 94 is rotatable in response to the actuation of the handle 114.

Suitable indicia 146 may be provided on the front of the valve body adjacent the handle 130, and if desired, the front of the valve body may assume the form of a removable plate 148, secured to the main portion of the valve body by a plurality of screws 150, so that access to the interior of the valve body may be had.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having thus described the invention, what is claimed is new is:

1. A control valve of the type described, comprising a body having first and second inlets, a mixing chamber, first and second valve ports connecting the respective inlets to said chamber, and an outlet connected to the mixing chamber, first and second valve members having spaced parallel axes and coacting with the respective ports, coupling means operatively connecting said members together whereby either member may be rotated to a closed position while the other is simultaneously opened, a control handle on said body operatively connected to said coupling means, and flow regulating means provided between said chamber and said outlet, said flow regulating means comprising an outlet compartment between said outlet and said chamber, a passageway between said chamber and said compartment, a third valve member coacting to selectively close said passageway and regulating means for actuating said third valve member, said regulating means including a control knob on said body, a shaft connected to said knob, a drive sprocket on said shaft, a driven sprocket on said third rotary valve member, and a first endless belt engaging said drive sprocket and said driven sprocket.

2. A control valve of the type described, comprising a body having first and second inlets, a mixing chamber, first and second valve ports connecting the respective inlets to said chamber, and an outlet connected to the mixing chamber, first and second valve members having spaced parallel axes and coacting with the respective ports, coupling means operatively connecting said members together whereby either member may be rotated to a closed position while the other is simultaneously opened, a control handle on said body operatively connected to said coupling means, and flow regulating means provided between said chamber and said outlet, said flow regulating means comprising an outlet compartment between said outlet and said chamber, a passageway between said chamber and said compartment, a third valve member coacting to selectively close said passageway, and regulating means for actuating said third valve member, said regulating means including a control knob on said body, a shaft connected to said knob, a drive sprocket on said shaft, a driven sprocket on said third rotary valve member, and a first endless belt engaging said drive sprocket and said driven sprocket, first and second stems connected to said first and second valve members, said coupling means including other sprockets on said stems, and a second endless chain engaging said other sprockets, said control handle being connected to said first stem.

References Cited in the file of this patent

UNITED STATES PATENTS

| | | |
|---|---|---|
| 2,145,844 | Brown | Feb. 7, 1939 |
| 2,180,790 | Brummett | Nov. 21, 1939 |
| 2,571,047 | McWilliams | Oct. 9, 1951 |
| 2,575,305 | Stryzakoski | Nov. 13, 1951 |

FOREIGN PATENTS

| | | |
|---|---|---|
| 934,421 | France | 1948 |